(12) United States Patent
Kim et al.

(10) Patent No.: US 9,419,795 B2
(45) Date of Patent: *Aug. 16, 2016

(54) DIGITAL DEVICE AND METHOD FOR PERFORMING SECURE COMMUNICATION USING SAME

(71) Applicant: INTELLECTUAL DISCOVERY CO., LTD., Seoul (KR)

(72) Inventors: Seungil Kim, Seoul (KR); Youngil Ko, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 137 days.

This patent is subject to a terminal disclaimer.

(21) Appl. No.: 14/259,592

(22) Filed: Apr. 23, 2014

(65) Prior Publication Data

US 2014/0325206 A1    Oct. 30, 2014

(30) Foreign Application Priority Data

Apr. 24, 2013  (KR) .................. 10-2013-0045200
Apr. 30, 2013  (KR) .................. 10-2013-0048893

(51) Int. Cl.
  *H04L 29/06*   (2006.01)
  *H04L 9/08*   (2006.01)
  *G09C 5/00*   (2006.01)
  *H04W 12/04*   (2009.01)
  *H04K 1/00*   (2006.01)

(52) U.S. Cl.
  CPC ............ *H04L 9/0872* (2013.01); *G09C 5/00* (2013.01); *H04K 1/00* (2013.01); *H04W 12/04* (2013.01); *H04L 2209/805* (2013.01)

(58) Field of Classification Search
  None
  See application file for complete search history.

(56) References Cited

U.S. PATENT DOCUMENTS

| 5,715,316 | A  | * | 2/1998 | Steenblik | ........ G09C 5/00 380/54 |
| 7,305,091 | B1 | * | 12/2007 | Hirano | ........ H04L 9/0858 380/255 |
| 7,333,611 | B1 | * | 2/2008 | Yuen | ........ H04B 10/70 380/256 |
| 8,170,214 | B2 | * | 5/2012 | Harrison | ........ H04B 10/114 380/278 |
| 2004/0128512 | A1 | * | 7/2004 | Sharma | ........ G06Q 20/3823 713/176 |
| 2007/0113076 | A1 | * | 5/2007 | Cowburn | ........ H04K 1/00 713/159 |
| 2008/0301767 | A1 | * | 12/2008 | Picard | ........ G06T 1/0042 726/2 |
| 2009/0091530 | A1 | * | 4/2009 | Yoshida | ........ G06F 3/002 345/156 |
| 2010/0322485 | A1 | * | 12/2010 | Riddiford | ........ G06F 3/04842 382/115 |
| 2012/0039617 | A1 | * | 2/2012 | Duligall | ........ H04B 10/1141 398/152 |
| 2012/0168506 | A1 | * | 7/2012 | Ruehrmair | ........ G06F 21/73 235/454 |

OTHER PUBLICATIONS

Bagherpour, Matin; Sepehri, Mohammad Mehdi; Sharifyazdi, Mehdi. Approximation of a Confidence Interval for Link Distances in Mobile Ad Hoc Networks. COMSWARE, 2008. Relevant pp. 520-527. http://ieeexplore.ieee.org/stamp/stamp.jsp?tp=&arnumber=4554468.*

(Continued)

*Primary Examiner* — Jeremiah Avery

(57) ABSTRACT

Disclosed is a method for performing secure communication using a digital device. The method includes outputting a light pattern using a radiator of a proximity sensor unit; and detecting the proximity of an object using the proximity sensor unit. Further, the method includes, when the object is in proximity within a predetermined distance range, extracting key generation information for the secure communication using the light pattern outputted from the radiator; generating a security key using the key generation information; and performing the secure communication with an external device using the generated security key.

14 Claims, 11 Drawing Sheets

(56) References Cited

OTHER PUBLICATIONS

Macii, David; Trenti, Fabrizio; Pivato, Paolo. A Robust Wireless Proximity Detection Technique based on RSS and ToF Measurements. 2011 IEEE International Workshop on Measurements and Networking Proceedings (M&N). Relevant pp. 31-36. http://ieeexplore.ieee.org/stamp/stamp.jsp?tp=&arnumber=6088482.*

* cited by examiner

| FILE | ATTRIBUTE INFORMATION | FILE SIZE (MB) |
|------|----------------------|----------------|
| A    | 1                    | 25             |
| B    | 0                    | 100            |
| C    | 0                    | 25             |
| D    | 1                    | 50             |
| E    | 0                    | 30             |

DIGITAL DEVICE AND METHOD FOR PERFORMING SECURE COMMUNICATION USING SAME

CROSS-REFERENCE TO RELATED APPLICATIONS

The present invention claims priority of Korean Patent Application No. 10-2013-0045200, filed on Apr. 24, 2013, and Korean Patent Application No. 10-2013-0048893, filed on Apr. 30, 2013, which are incorporated herein by references.

FIELD OF THE INVENTION

The present invention relates to a digital device and a method for performing secure communication using the same, and, more particularly, to a method for performing secure communication between digital devices by creating a security key for communication between the digital devices and using the security key.

BACKGROUND OF THE INVENTION

A pairing between devices is an indispensable element in an Ad-Hoc network environment in which a variety of devices are connected for use. The Ad-Hoc network does not require an infrastructure network that is generally needed to communicate between respective devices which are members of the networks. In other words, the Ad-Hoc network does not necessary to equip repeaters between the devices such as routers, AP (Access Points), or the like that constitutes the network. The Ad-Hoc network can be established once the partial connection between the respective devices in the Ad-Hoc network, that is, a pairing between a current specific device and another device is performed.

In recent, the supply of portable devices and the communication using these portable devices are in a trend to be increased. Accordingly, in an environment without having an infrastructure network for communication between devices, the Ad-Hoc network becomes more and more important due to its ability to provide the communication between the devices anytime and anywhere. Examples of the Ad-Hoc network may be the data transfer between one smart phone and the other smart phone, the screen linkage between a smart phone and a tablet device or smart TV, and the like.

Because the infrastructure network does not exist in an Ad-Hoc network environment, it is important to generate and manage a security key to be used in the communication security between devices. There is no trusted authority on the Ad-Hoc network environment generally and thus a method to share a security key between devices is considerably limited. Meanwhile, an RSA (Rivest Shamir Adleman) method, which is one of public key encryption methods, is widely used to provide secure communication between devices. This algorithm employs two large numbers (typically 140 digits or more), constituting one public key and one private key by multiplying and further calculating the two numbers. The public key and the private key can be used to encrypt and decrypt data for communication. The RSA method has a shortcoming in that it requires a large amount of computation. It takes as little as 20 minutes to as long as several minutes for a Pentium-level computer to generate the public key and the private key. In addition, the RSA method also requires a large amount of calculation in decryption. However, it is not easy for portable devices to secure a higher computing power against a battery issue, handheld issue, heat generation issue, and the like. Therefore, the RSA method requiring a mass calculation may not be suitable for security solution to the Ad-Hoc network.

On the other hand, there are increased cases that a user perform tasks on a terminal of a company or a public institution using a file received or downloaded from an external device or a data server. Since a terminal with which a user performs tasks may be commonly used by other persons in the future, there occurs a need to protect privacy of task contents. In the service scheme embodied in an available operating system (OS), it is necessary to store work contents in a local storage space such as a hard disk. Although a user deletes the work contents after completing the work, there necessarily remain physical traces, and therefore, it is possible to recover them using various recovery methods. Accordingly, there is a problem that privacy of data may not be guaranteed.

SUMMARY OF THE INVENTION

In view of the above, the present invention provides a solution to efficiently generate a security key for secure communication between devices in a network environment.

Further, the present invention provides a solution allowing for the devices to perform secure communication to share a security key securely.

Further, the present invention provides a solution to maintain the security of data so as not to leak out log information about the data when performing a work for the data of an external device through a local device.

In accordance with a first aspect of the present invention, there is provided a method for performing secure communication using a digital device. The method includes: outputting a light pattern using a radiator of a proximity sensor unit; and detecting the proximity of an object using the proximity sensor unit; when the object is in proximity within a predetermined distance range, extracting key generation information for the secure communication using the light pattern outputted from the radiator; generating a security key using the key generation information; and performing the secure communication with an external device using the generated security key.

The method may further comprise stopping the output of the light pattern when the object is not in proximity within the predetermined distance range for a preset period of time.

The method may further comprise detecting orientation information of the digital device, and the outputting a light pattern may comprise outputting the light pattern when the orientation of the digital device matches a predetermined orientation.

Further, the performing secure communication may comprise encrypting data with the security key that is generated; and sending the data that is encrypted to the external device.

Further, the performing secure communication may comprise receiving data from the external device; and decrypting the data that is received with the security key.

In accordance with a second aspect of the present invention, there is provided a digital device. The digital device includes: a processing unit configured to the operation of the digital device; a proximity sensor unit, wherein the proximity sensor unit includes a radiator to output a light pattern and a receiver to receive a light pattern; and a communication unit configured to transmit and receive data based on an instruction from the processing unit. Further, the digital device may be configured to: output the light pattern using the radiator of the proximity sensor unit; detect the proximity of an object using the proximity sensor unit; when the object is in proximity within a predetermined distance range, extract key generation information for secure communication using the light pattern outputted from the radiator; generate a security key using the key generation information; and performing the secure communication with an external device using the security key that is generated.

Further, the digital device may be further configured to stop the output of the light pattern when the object is not in proximity within the predetermined distance range for a preset period of time.

The digital device may further comprise a sensor unit configured to detect orientation information on the digital device and provide the detected orientation information to the processing unit, and the digital device may be configured to output the light pattern when the orientation of the digital device matches a predetermined orientation.

Further, the secure communication may comprise encrypting data with the security key that is generated; and sending the data that is encrypted to the external device.

Further, the secure communication may comprise receiving data from the external device; and decrypting the data that is received with the security key.

Further, the method may further comprise approaching to the data of the external device; obtaining attribute information corresponding to the data, wherein the attribute information includes a private attribute and a public attribute; and storing log information of the data depending on the attribute information, and the storing may comprise: storing the log information in a first storage unit in the case that the attribute information is the public attribute; and storing the log information in a second storage unit in the case that the attribute information is the private attribute.

Further, the second storage unit may be a volatile medium.

Further, the first storage unit may be a basic storage unit of the digital device.

Further, the attribute information may be obtained based on a user input made through the digital device.

Further, the method may further comprise assigning an area of the second storage unit that stores the log information of the data, and the size of the area may be determined based on the size of the data having the private attribute.

Further, the digital device may further comprise first and second storage units configured to store the data based on the command of the processor, and the processor may be further configured to: approach to the data of the external device; obtain attribute information corresponding to the data that is approached, the attribute information including a private attribute and a public attribute; and store log information of the data depending on the attribute information, wherein the log information is stored in a first storage unit in the case that the attribute information is the public attribute and the log information is stored in a second storage unit in the case that the attribute information is the private attribute.

Further, the second storage unit may be a volatile medium.

Further, the first storage unit may be a basic storage unit of the digital device.

Further, the attribute information may be obtained based on a user input made through the digital device.

Further, the processor may be further configured to assign an area of the second storage unit to store the log information of the data, the size of the area may be determined based on the size of the data having the private attribute.

In accordance with one or more embodiments, it is possible to generate and share a security key for secure communication between devices with small amount of calculation.

In accordance with one or more embodiments, it is also possible to avoid the danger such as a hacking because of not using a separate communication channel in sharing a security key between devices.

In accordance with an embodiment of the present invention, it is possible to prevent log information of digital data having a private attribute from being recorded in a non-volatile storage of a local device and then remained physically.

The present invention is intended to provide a method for sharing a security key in secure communication, in particular, in the secure communication using a symmetrical key encryption method.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Although the terms used in the following description are selected, as much as possible, from general terms that are widely used at present while taking into consideration of the functions obtained in accordance with the present invention, these terms may be replaced by other terms based on intensions of those skilled in the art, customs, emergence of new technologies, or the like. Also, in a particular case, terms that are arbitrarily selected by the applicant of the present invention may be used. In this case, the meanings of these terms may be described in corresponding description parts of the invention. Accordingly, it should be noted that the terms used herein should be construed based on practical meanings thereof, and the whole content of this specification, rather than being simply construed based on the names of the terms.

Hereinafter, the embodiments of the present invention will be described in detail with reference to the accompanying drawings which form a part hereof.

Figure 1:
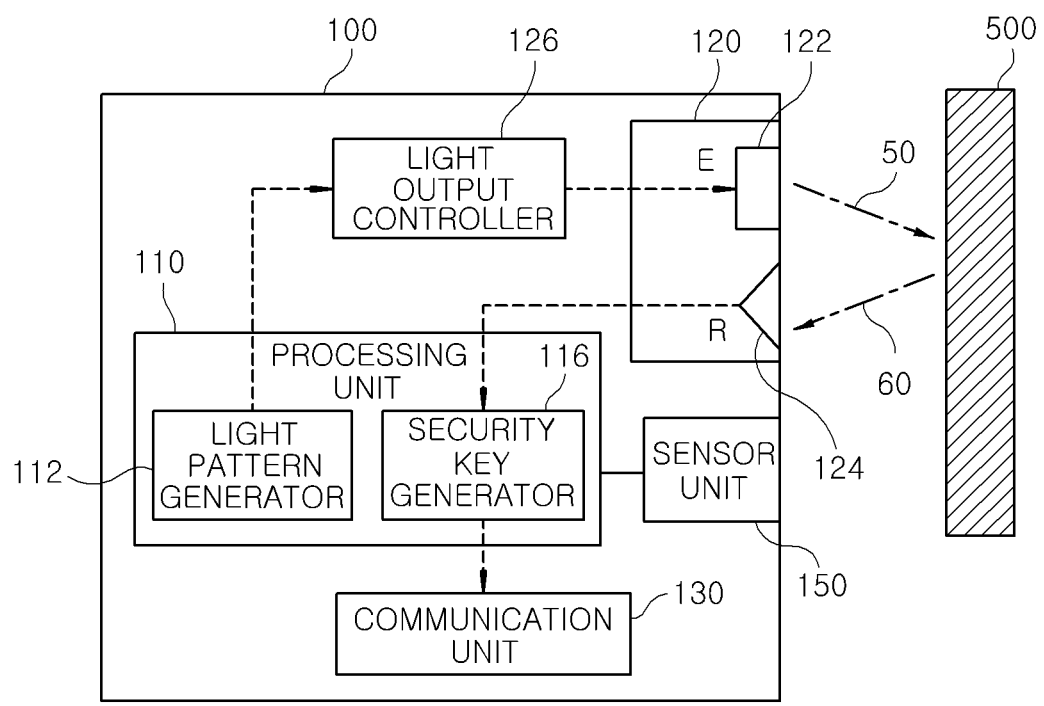
FIG. 1 is a block diagram of a digital device in accordance with an embodiment of the present invention.

FIG. 1 is a block diagram of a digital device 100 in accordance with an embodiment of the present invention. Referring to FIG. 1, the digital device 100 of the embodiment may include a processor 110, a proximity sensor unit 120 and a communication unit 130.

First, the proximity sensor unit 120 includes a radiator 122 that radiates light using an LED (Light Emitted Diode) or the like and a receiver 124 that senses the light using a phototransistor or the like. The radiator 122 may output a light pattern 50 under the control of a light output controller 126. In accordance with the embodiment, the light output controller 126 may be incorporated in the proximity sensor unit 120 or may be a separate unit from the proximity sensor unit 120. Inn the case that a particular object 500 is situated close enough to the proximity sensor unit 120, the light pattern 50 outputted from the radiator 122 is reflected from the object 500. The light pattern 60 that is reflected is received by the receiver 124 of the proximity sensor unit 120 and thus the presence of the object 500 in close proximity can be detected by the proximity sensor unit 120.

The communication unit 130 may transmit and receive data in communication with external devices or servers using various communication protocols. In accordance with an embodiment of the present invention, the communication unit 130 may perform security communication with external devices using a various type of communication means. Available wireless communication means may include an NFC (Near Field Communication), Zigbee, infrared communication, WiFi (Wireless Fidelity), cellular network, and the like, but the embodiment is not limited thereto. The communication between the digital device 100 and external device may be made through any one of the communication means enumerated above or may be made through the combination thereof.

The processing unit 110 of the embodiment may perform various operations of the digital device 100. The processing unit 110 may run an Operating System, various applications or multimedia contents, and the like. Further, in accordance with the embodiment, the processing unit 110 may perform diverse calculations for generating a security key. The processing unit 110 may include a light pattern generator 112 and a security key generator 116. The light pattern generator 112 causes the radiator 122 to generate the light pattern 50. Specifically, the light pattern generator 112 generates a specific pattern and transfers it to the light output controller 126, which in turn outputs light of the received pattern by the use of the radiator 122. Further, the security key generator 116 generates the security key using the light pattern. In accordance with the embodiment, the security key generator 116 may extract key generation information using the light pattern 60 that is received by the receiver 124 and then generates the security key by use of the extracted key generation information. In addition, the processing unit 110 may control the respective components in the digital device 100 and transmission and reception of data between the components.

Meanwhile, in accordance with one embodiment of the present invention, the digital device 100 may further include another sensor unit 150. The sensor unit 150 may serve to transfer user inputs or environments recognized by the digital device 100 to the processing unit 110 using at least one sensor. In this regard, the sensor unit 150 may include a plurality of sensing means. As one example, the plurality of sensing means may include gravity sensors, geomagnetic sensors, motion sensors, gyro sensors, acceleration sensors, infrared sensors, inclination sensors, illuminance sensors, proximity sensor units, altitude sensors, olfactory sensors, temperature sensors, depth sensors, pressure sensors, bending sensor, audio sensors, video sensors, microphones, micro arrays, GPS (Global Positioning System) sensors, touch sensors, and the like. The aforementioned sensors may be included in the digital device 100 as a separate element or integrated in at least one or more elements. In accordance with the embodiment of the present invention, the sensor unit 150 may detect orientation information of the digital device 100 using at least one of the plural sensing means enumerated above and transfer the detected orientation information to the processing unit 110. In this case, the orientation information may include angular information of the digital device 100 relative to at least one axis of x-, y- and z-axes.

Figure 2:
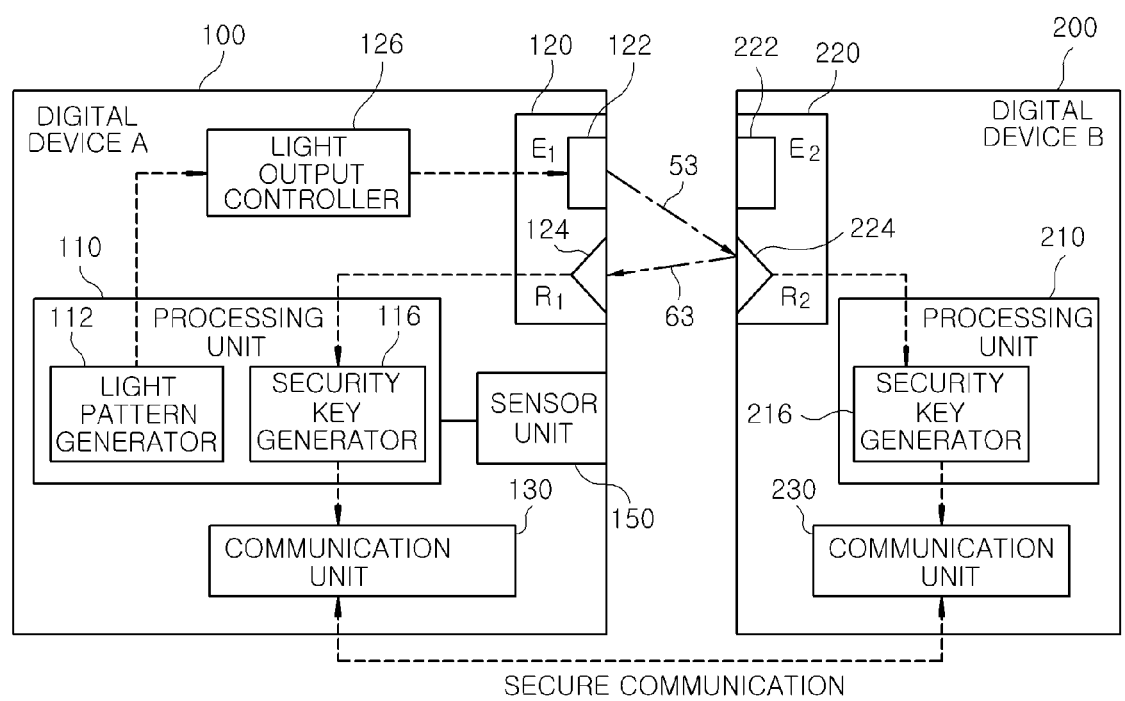
FIG. 2 is a block diagram of a digital device and an external device in accordance with a first embodiment of the present invention.

FIG. 2 is a block diagram of the digital device 100 and the external device 200 in accordance with a first embodiment of the present invention. The respective components of the digital device 100 shown in FIG. 2 are the same as those in FIG. 1, and the external device 200 may include similar or corresponding components to those of the digital device 100.

First, when the light pattern for secure communication is generated from the light pattern generator 112 of the digital device 100 and transferred to the light output controller 126, the light output controller 126 controls the radiator E1 or 122 and outputs a first light pattern 53. As illustrated in FIG. 2, when the proximity sensor unit 120 of the digital device 100 and a proximity sensor unit 220 of the external device 200 are in proximity with each other, a receiver R2 or 224 of the external device 200 may receive the first light pattern 53. Further, a receiver R1 or 124 of the digital device 100 may receive a second light pattern 63. In case where the first light pattern 53 is reflected from the external device 200 to generate the second light pattern 63, both the first light pattern 53 and the second light pattern 63 may have same pattern information. That is, in accordance with an embodiment of the present invention, the receiver R1 or 122 of the digital device 100 and the receiver R2 or 224 of the external device 200 may receive the light pattern outputted from the radiator E1 or the radiator 122 of the digital device 100.

The security key generator 116 of the digital device 100 generates the security key using the second light pattern 63 obtained by the receiver R1 or 124. Further, the security key generator 216 of the external device 200 generates the security key using the first light pattern 53 obtained by the receiver R2 or 224. In the embodiment of the present invention, in case where the proximity sensor unit 120 of the digital device 100 and 220 of the external device 200 are in close proximity with each other, the security keys generated by the respective devices may be identical to each other. Hence, the communication unit 130 of the digital device 100 and a communication unit 230 of the external device 200 may communicate with each other using the generated security keys. If either one of the security key generator 116 of the digital device 100 or the security key generator 216 of the external device 200 fails to generate the security key, it is impossible to perform the secure communication between both devices. In accordance with an embodiment of the present invention, the light pattern generator 112 of the digital device 100 may be configured to generate again a light pattern for the security key generation. In this regard, the re-generated light pattern may be a light pattern different from the first light pattern 53 that was generated previously.

In accordance with an embodiment of the present invention, the digital device 100 and the external device 200 may safely share the security key for secure communication. In case where the digital device 100 and the external device 200 are not close to each other, it is natural that the second light pattern 63 reflected toward the receiver R1 or 124 is very weak. Therefore, the digital device 100 cannot generate the security key. Reversely, in case where both devices are far away from each other, the first light pattern 53 received by the receiver R2 or 224 is also very weak. In this case, the external device 200 cannot generate the security key as well. In other words, in accordance with an embodiment of the present invention, the security key may be shared only when the digital device 100 and the external device 200 closely approach each other, thereby preventing information on the security key from being leaked to a third party.

The digital device 100 and the external device 200 are separately illustrated in a form of blocks in FIGS. 1 and 2, and these blocks represent the components of the devices that are logically differentiated and identified. Accordingly, these components of the devices may be mounted as a single chip or as multiple chips, depending on the design of the devices.

Figure 3:
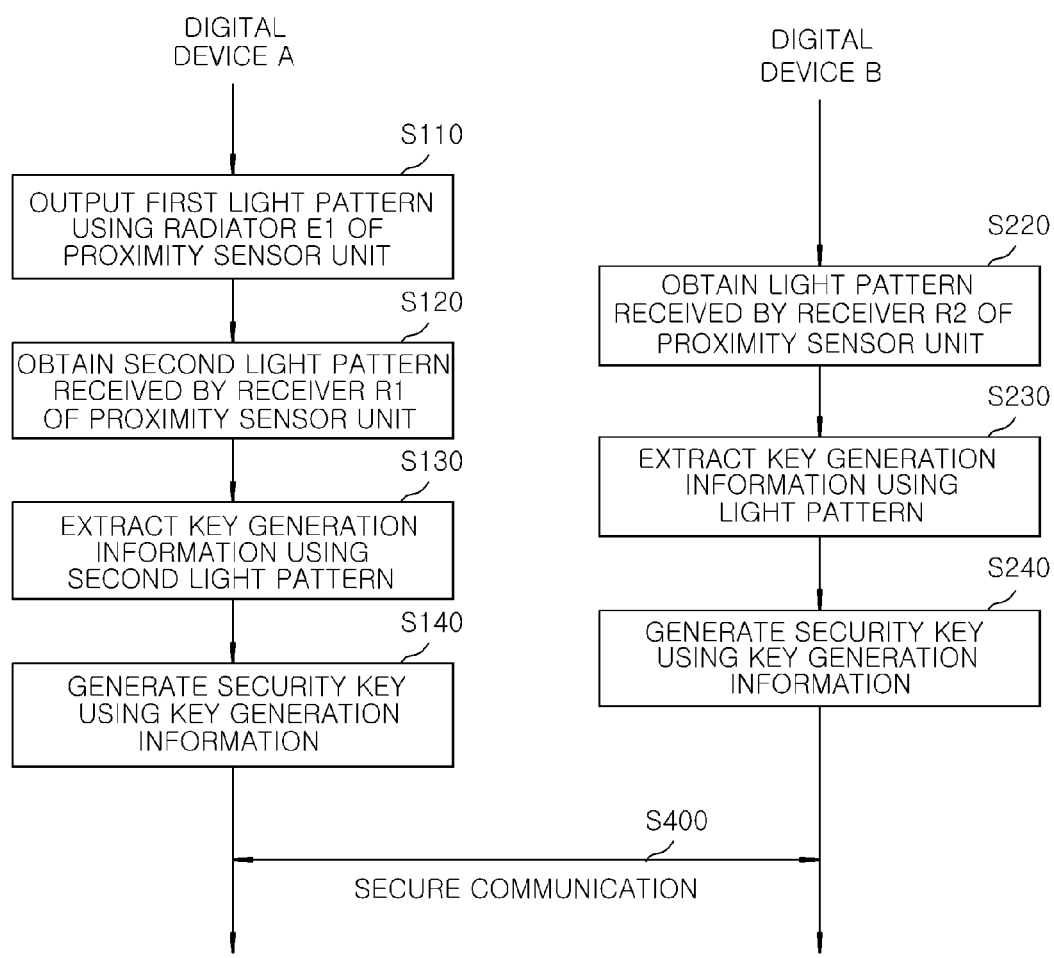
FIG. 3 is a sequential flow diagram illustrating a method for performing secure communication in accordance with a first embodiment of the present invention.

FIG. 3 is a sequential flow diagram illustrating a method for performing secure communication in accordance with a second embodiment of the present invention. In the embodiment of FIG. 3, a device A may correspond to the digital device 100 of FIG. 2, and a device B may correspond to the external device 200 of FIG. 2.

First, the device A outputs a first light pattern using a radiator E1 of a proximity sensor unit (Block S110). The first light pattern includes pattern information generated by a light pattern generator of the device A. Next, the device A obtains a second light pattern that is received through a receiver R1 of the proximity sensor unit (Block S120). When the device A and the device B are in proximity to each other in accordance with an embodiment of the present invention, the second light pattern received by the receiver R1 includes the same pattern information as the first light pattern outputted by the radiator E1.

On the other hand, in accordance with an embodiment of the present invention, in case where the second light pattern is not received for a predetermined time, the device A may stop outputting the first light pattern. In other words, when the second light pattern is not received by the receiver R1 of the device A, it may represent that the device A and the device B are not close to each other. If the device A and the device B are not close to each other, the device A stop outputting the first light pattern because the first light pattern outputted from the radiator E1 of the device A may be exposed to the outside.

In accordance with another embodiment of the present invention, the device A may be configured to detect orientation information of the device A using a sensor unit and then output the first light pattern based on the detected orientation information. That is, when the detected orientation of the device A matches a preset orientation, the device A may output the first light pattern. If the device B's orientation of both the device A and the device B that are close to each other satisfies the preset orientation, the device A will not output a light pattern but the device B will output a light pattern. Therefore, a priority to indicate whether which of the device A and the device B outputs a light pattern may be given in accordance with an embodiment of the present invention.

Subsequently, the device A extracts the key generation information using the second light pattern that is obtained (Block S130). In accordance with an embodiment of the present invention, the device A may quantize the received second light pattern in predetermined time intervals and then detect whether the light is sensed ('ON' or 'OFF'). In accordance with one embodiment of the present invention, the device A may extract the key generation information of binary digits in respective time intervals where a section ('ON') having light sensed becomes a logical '1' and a section ('OFF') without light sensed becomes a logical '0'. However, the embodiment is not limited to the above, and alternatively, it may be possible to extract the key generation information of binary digits where a section ('ON') having light sensed becomes a logical '0' and a section ('OFF') without light sensed becomes a logical '1'.

On the other hand, in accordance with one embodiment of the present invention, the device A may obtain information on the first light pattern outputted from the radiator E1. In other words, a processing unit in the device A may obtain information on the first light pattern generated by the light pattern generator and compare it to the second light pattern that is received. If the second light pattern includes the same pattern information as the first light pattern, the device A may extract the key generation information using the second light pattern. However, the second light pattern does not have the same pattern information as the first light pattern, the device A may stop extracting the key generation information and receive a new light pattern through the receiver R1.

After that, the device A generates the security key using the key generation information that is extracted (Block S140). In accordance with an embodiment of the present invention, the device A may generate the security key using the key generation information for the predetermined time interval. As the predetermined time interval is longer, the security key will have more amounts of data.

Meanwhile, the device B obtains the light pattern that is received through the receiver R2 of the proximity sensor unit (Block S220). When the device A and the device B are in proximity to each other in accordance with an embodiment of the present invention, the light pattern that is received by the receiver R2 includes the same pattern information as the first light pattern that is outputted by the radiator E1.

Next, the device B extracts the key generation information using the light pattern that is obtained (Block S230). The detailed method of extracting the key generation information by the device B is the same as described at Block S130. After that, the device B generates the security key using the extracted the key generation information (Block S140). In accordance with an embodiment of the present invention, the device B may generate the security key using the key generation information for the same time interval in the device A. In accordance with an embodiment of the present invention, the device A and the device B may respectively check current time using their sensor units, e.g., GPS sensors. Accordingly, the device A and the device B may be synchronized so that the receiver R1 and the receiver R2 can obtain the light patterns for the same point of time.

The device A and the device B perform the secure communication through the use of the generated the security keys (Block S400). Specifically, the device A may encrypt data using the security key generated in Block S140 and send the encrypted data to the device B. The device A may also receive data from the device B and decrypt the received data using the security key generated at Block S140. Similarly, the device B may encrypt data using the security key generated in Block S240 and send the encrypted data to the device A. The device B may also receive data from the device A and decrypt the received data using the security key generated at Block S240.

Figure 4:
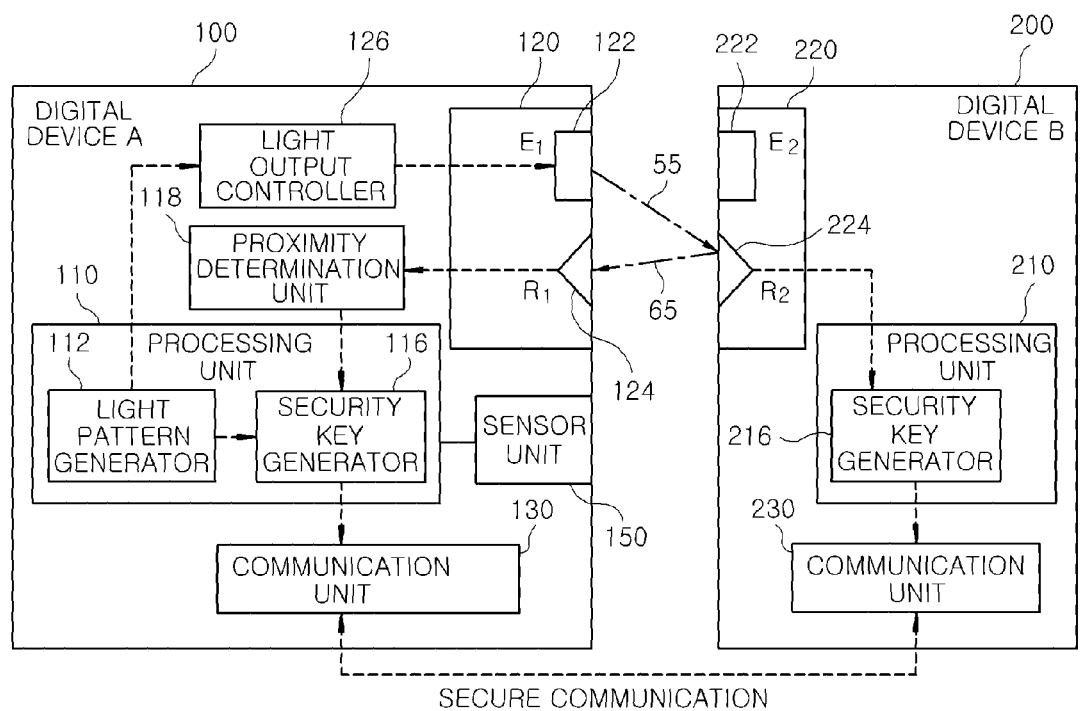
FIG. 4 is a block diagram of a digital device and an external device in accordance with a second embodiment of the present invention.

FIG. 4 is a block diagram of a digital device 100 and an external device 200 in accordance with a second embodiment of the present invention. In FIG. 4, identical or corresponding components to those in the embodiment of FIG. 2 will not be described in detail for the sake of simple explanation.

The digital device 100 in the embodiment of FIG. 2 generates a security key using a second light pattern 63 that is received through a receiver R1 or 124. In the embodiment of FIG. 4, however, the digital device 100 may generate the security key by the use of light pattern information that is directly provided from a light pattern generator 112. That is, a security key generator 116 of the digital device 100 obtains directly from the light pattern generator 112 the information of a light pattern 55 that is outputted from the radiator E1 or 122. The security key generator 116 may extract key generation information using information on the light pattern 55 that is obtained.

Meanwhile, the digital device 100 may further include a proximity determination unit 118 to determine the proximity of an object based on a sensing value of the receiver R1. The proximity determination unit 118 may be incorporated in the proximity sensor unit 120 or may be included as a separate unit from the proximity sensor unit 120. The proximity determination unit 118 detects whether an object is in proximity thereto based on a light pattern 65 that is received through the receiver R1 or 124 and then provides the detected result to the processing unit 110. When the object approaches within a predetermined distance range, the security key generator 116 extracts the key generation information using the light pattern 55 that is outputted from the radiator E1 or 122. As set forth above, the device A may identifies whether the device B approaches enough to perform the secure communication and generate the security key only when the device B approaches closely thereto. However, when the device B is not in close proximity, the light pattern 55 that was outputted from the radiator E1 or 122 might be exposed to the outside. Therefore, in the case that the device B is not in close proximity, the device A causes the radiator E1 or the radiator 122 to stop the output of the light pattern 55.

Figure 5:
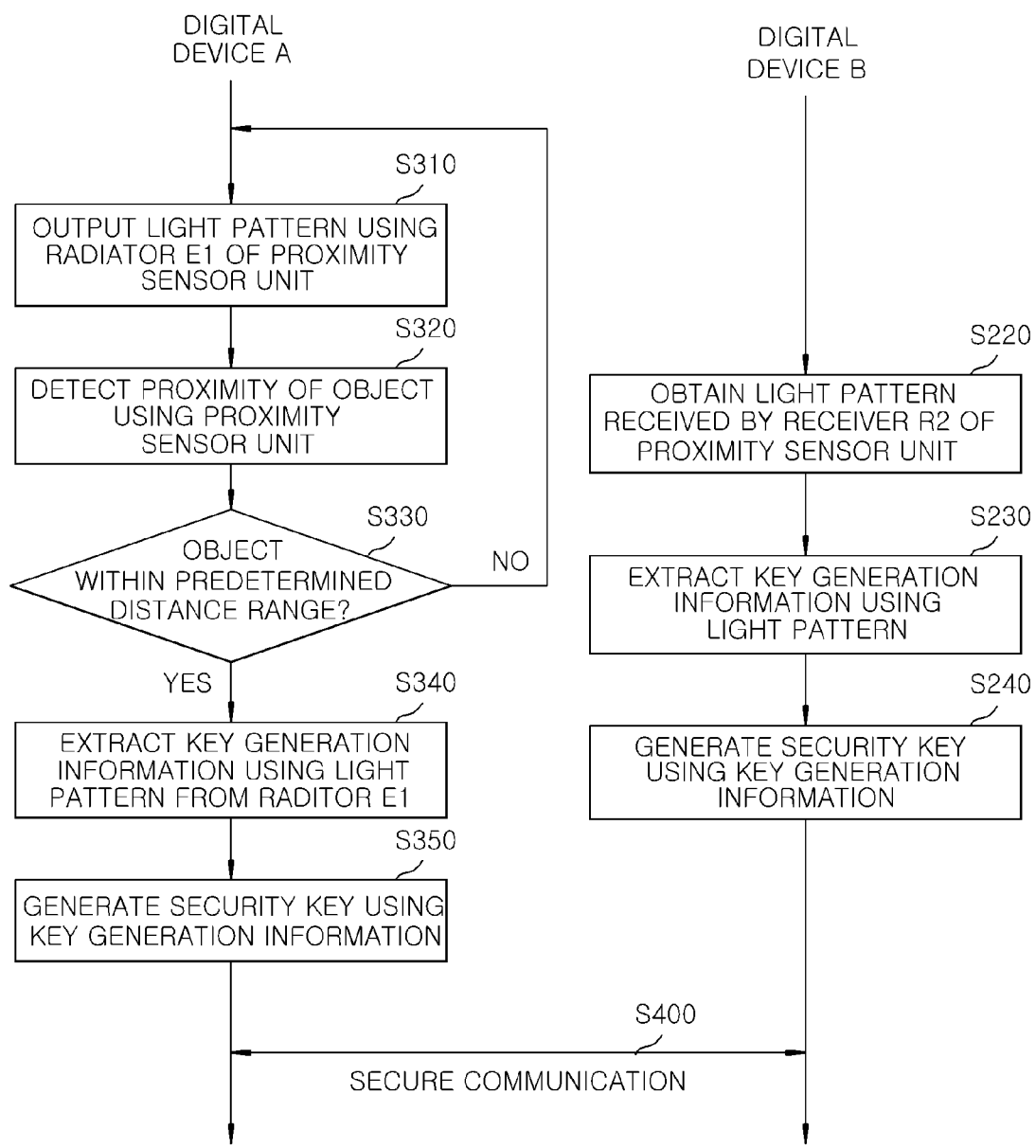
FIG. 5 is a sequential flow diagram illustrating a method for performing a secure communication in accordance with a second embodiment of the present invention.

FIG. 5 is a sequential flow diagram illustrating a method for performing a secure communication in accordance with a second embodiment of the present invention. In the embodiment of FIG. 5, the device A may correspond to the digital device 100 in FIG. 4 and the device B may correspond to the external device 200 in FIG. 4. In the embodiment of FIG. 5, identical or corresponding components to those in the embodiment of FIG. 3 will not be described in detail for the sake of simple explanation.

First, the device A outputs a light pattern using a radiator E1 of a proximity sensor unit (Block S310). The light pattern includes pattern information that is generated by a light pattern generator of the device A. Next, the device A detects whether an object is in proximity through the use of the proximity determination unit (Block S320). The proximity determination unit of the device A may determine the proximity of the object based on the light pattern that is received by the receiver R1 of the device A. The device A determines whether the object is in proximity within a predetermined distance range (Block S330).

When the object is in proximity within the predetermined distance range, the device A extracts key generation information using a light pattern that is outputted from the radiator E1 (Block S340). The device A also generates a security key using the extracted key generation information (Block S350). In accordance with an embodiment of the present invention, the security key generator of the device A may obtain information on the light pattern, which is outputted by the radiator E1, directly from the light pattern generator. The embodiments of the methods for extracting the key generation information and generating the security key by the device A are the same as described with reference to FIG. 3.

Meanwhile, when the object is determined to be not in proximity within the predetermined distance range, the device A may return to Block S310 without extracting the key generation information. In accordance with another embodiment of the present invention, in the case that the object is in proximity within the predetermined distance range for a preset period of time, the device A may stop outputting the light pattern.

In accordance with another embodiment of the present invention, the device A may be configured to detect orientation information of the device A using a sensor unit and then output the light pattern based on the detected orientation information. That is, when the detected orientation of the device A matches a preset orientation, the device A may output the light pattern. If the device B's orientation of both the device A and the device B that are close to each other satisfies the preset orientation, the device A will not output a light pattern, but the device B will output a light pattern. Accordingly, a priority to indicate whether which of the device A and the device B outputs a light pattern may be given in accordance with an embodiment of the present invention.

The device A and the device B perform the secure communication through the use of the security key that is generated (Block S400). Specifically, the device A may encrypt data using the security key generated at Block S350 and send the encrypted data to the device B. The device A may also receive data from the device B and decrypt the received data using the security key generated at Block S350. Similarly, the device B may encrypt data using the security key generated at Block S240 and send the encrypted data to the device A. The device B may also receive data from the device A and decrypt the received data using the security key generated at Block S240.

Figure 6:
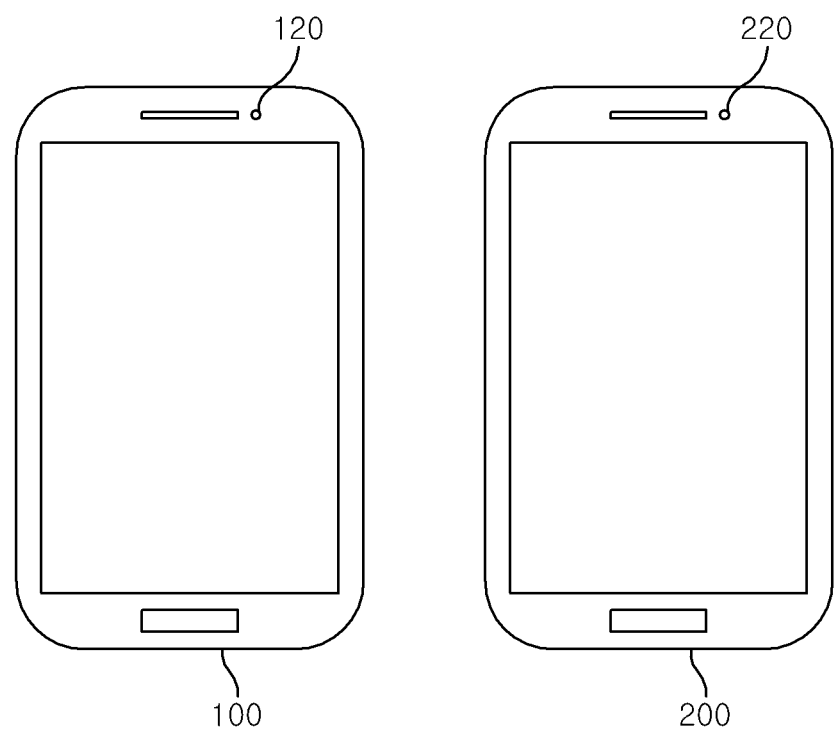
FIG. 6 is a schematic plan view of a digital device and an external device in accordance with an embodiment of the present invention.

FIG. 6 shows a schematic plan view of a digital device and an external device in accordance with one embodiment of the present invention.

As shown, a digital device 100 and an external device 200 of the embodiment of the present invention may include proximity sensor units 120 and 220, respectively. In accordance with an embodiment of the present invention, when the proximity sensor unit 120 of the digital device 100 and 220 of the external device 200 are placed close to face each other, both the devices may share a security key for secure communication. In this case, both devices do not use a separate communication channel, thereby avoiding the danger of the security key to be intercepted by a third party.

Figure 7A:
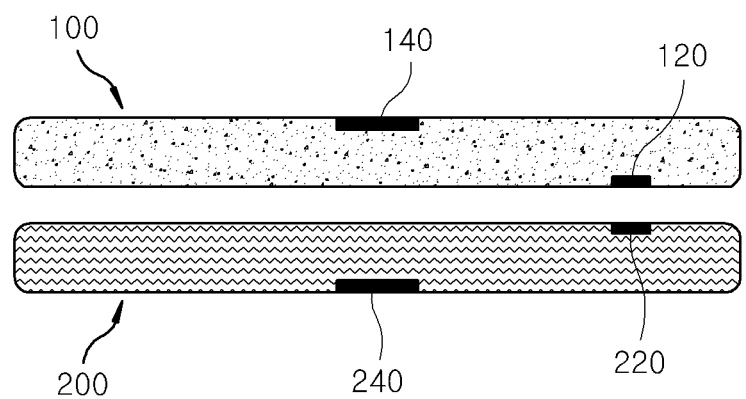
FIGS. 7A and 7B schematically show methods for performing secure communication between a digital device and an external device in accordance with another embodiment of the present invention.
Figure 7B:
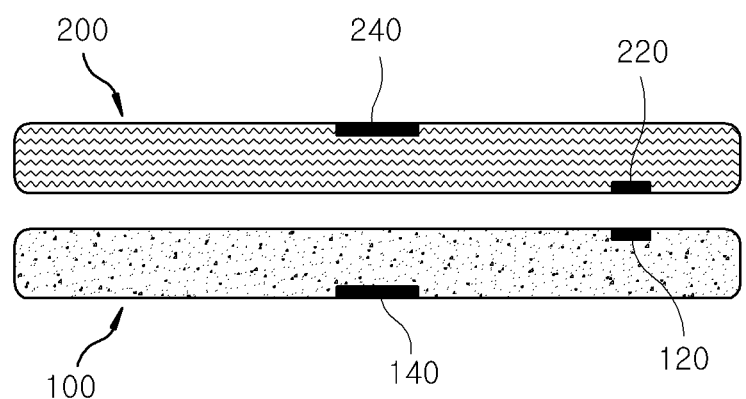

FIGS. 7A and 7B schematically show methods for performing secure communication between a digital device 100 and an external device 200 in accordance with another embodiment of the present invention. In the embodiments of FIGS. 7A and 7B, the digital device 100 and the external device 200 include their respective front surfaces with the proximity sensor units 120 and 220 mounted thereon.

In the case that the digital device 100 and the external device 200 perform the secure communication, it is needed to establish a priority to specify whether which one of two devices outputs a light pattern and which one of two devices receives the light pattern from the other. In accordance with an embodiment of the present invention, the digital device 100 and the external device 200 may specify the priority based on orientation information of the respective devices. Accordingly, the digital device 100 and the external device

200 may include sensor units 140 and 240, respectively, to detect their respective orientation information.

In accordance with an embodiment of the present invention, the digital device 100 and the external device 200 may have predetermined orientation information in order to output their respective light patterns. For example, it may be possible for a device to set such that a light pattern is outputted when the front surface of the device faces down and the light pattern is received when the front surface faces up. In that case, in FIG. 7A, the digital device 100 may output a light pattern and the external device 200 may receive the light pattern. In FIG. 7B, however, the external device 200 may output a light pattern and the digital device 100 may receive the light pattern. On the contrary, in the case that a device is set such that a light pattern is outputted when the front surface of the device faces up and the light pattern is received when the front surface faces down, the digital device 100 may output the light pattern in FIG. 7A and the digital device 100 may output the light pattern in FIG. 7B. In this case, the digital device 100 may receive the light pattern from the external device 200 in FIG. 7A, and the external device 200 may receive the light pattern from the digital device the digital device 100 in FIG. 7B. However, the device's priority to output the light pattern is merely an example and may be changed with various embodiments.

As described above, the digital device 100 and the external device 200 of the embodiment of the present invention may control whether to output the light pattern based on the orientation information of the respective devices, thereby avoiding the situation that all of the two devices output the light patterns and establishing the device's priority to generate the security key.

Figure 8:
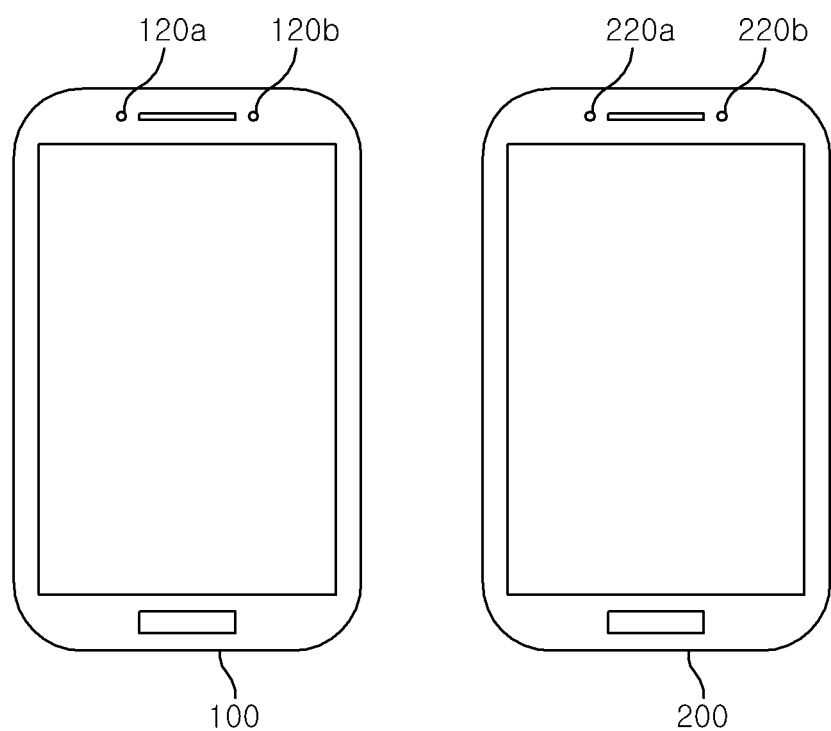
FIG. 8 is a schematic plan view of a digital device and an external device in accordance with further another embodiment of the present invention.

FIG. 8 is a schematic plan view of a digital device 100 and an external device 200 in accordance with further another embodiment of the present invention.

In accordance with the embodiment of the present invention, the digital device 100 may be provided with a plurality of proximity sensor units 120a and 120b. The external device 200 may also be provided with a plurality of proximity sensor units 220a and 220b. In order for the digital device 100 and the external device 200 to share the security key in accordance with an embodiment of the present invention, the proximity sensor unit 120a may face the proximity sensor unit 220b, and the proximity sensor unit 120b may face the proximity sensor unit 220a. In case where each of the devices includes a plurality of proximity sensor units, one of the plural proximity sensor units may be set to output a light pattern in advance. For example, it may be possible to set such that the proximity sensor unit located on the right side of the device outputs the light pattern and the proximity sensor unit located on the left side of the device receives the light pattern from the other device. In this regard, the digital device 100 may generate the light pattern to provide it to the proximity sensor unit 120a, and the external device 200 may receive the light pattern through the proximity sensor unit 220b. Further, the external device 200 may generate a light pattern to provide it to the proximity sensor unit 220a, and the digital device 100 may receive the light pattern through the proximity sensor unit 120b. Hence, in the case where each of the devices is provided with two proximity sensor units, the two devices may share two security keys with each other.

In accordance with one embodiment of the present invention, the digital device 100 and the external device 200 may perform the secure communication using all of two security keys that are generated. For example, assuming that the digital device 100 generates 'a security key A' and the external device 200 generates 'a security key B', the digital device 100 may encrypt data with 'the security key A' to send it to the external device 200, which in turn may decrypt data that is received with 'the security key A'. Further, the external device 200 may encrypt data with 'the security key B' to send it to the digital device 100, which in turn may decrypt data that is received with 'the security key B'. Alternatively, it is understood that the digital device 100 may encrypt data to be sent to the external device 200 with 'the security key B', and the external device 200 may encrypt data to be sent to the digital device 100 with 'the security key A'. As such, the digital device 100 and the external device 200 may employ encryption keys different from each other when transmitting and receiving the data.

Figure 9:
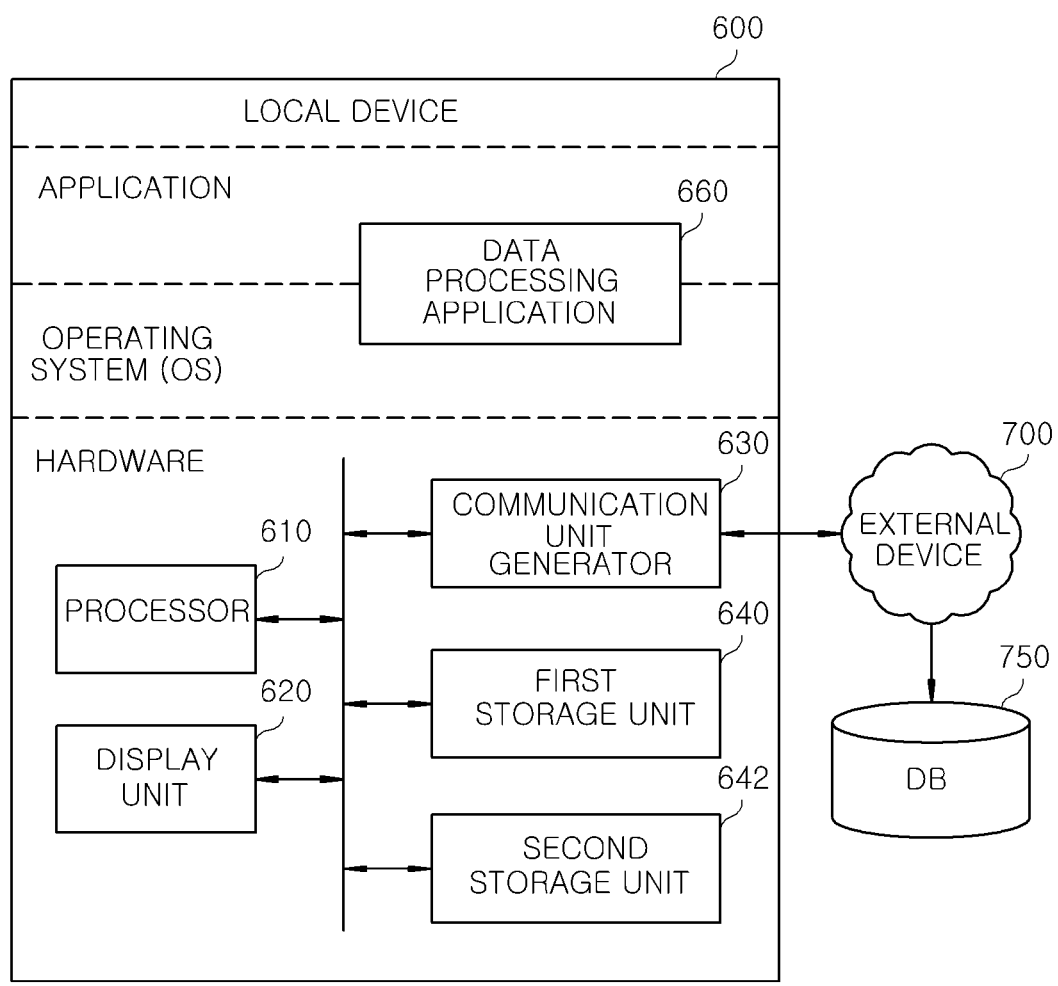
FIG. 9 is a block diagram illustrating a local device for securing data that is received or downloaded from an external device in accordance with an alternative embodiment of the present invention.

FIG. 9 is a block diagram illustrating a local device for securing data that is received or downloaded from an external device in accordance with an alternative embodiment of the present invention.

Referring to FIG. 9, a local device 600 may correspond to the digital device 100 in FIGS. 2 and 4, and a device 700 may correspond to the external device 200 in FIGS. 2 and 4.

The local device 600 in accordance with the embodiment may include a hardware layer, an operating system layer, and an application layer.

First, the hardware layer of the local device 600 may include a processor 610, a display unit 620, a communication unit 630, a first storage unit 640 and a second storage unit 642.

The display unit 620 outputs an image on a display screen. The display unit 620 may output the image based on contents executed by the processor 610 or a control command of the processor 610.

The communication unit 630 may transmit and receive data in communication with the external device 700 using various communication protocols. In accordance with the embodiment, the communication unit 630 may have access to the external device 700 over a network (not shown), thereby transmitting/receiving digital data. That is, the local device 600 may approach to at least one piece of digital data of the external device 700 using the communication unit 630.

The first storage unit 640 may store various data such as video digital data, audio digital data, photography data, and application digital data. The first storage unit 640 of the present embodiment is a basic storage unit of the local device 600, which may include various digital data storage spaces such as a hard disk, a flash memory, and an SSD (Solid Storage Device). That is, the local device 600 basically stores digital data and log information of the digital data in the first storage unit 640.

The second storage unit 642 is a second space to store digital data, which is characterized by a volatile medium in accordance with an embodiment of the present invention. That is, the second storage unit 642 of the embodiment may include various types of storage space, in which information stored is deleted if electric power is not provided, like a RAM (Random Access Memory).

The processor 610 of the embodiment may execute contents received through data communication, or contents stored in the first and second storage units 640 and 642. Further, the processor 610 may run various applications, and process data within the device. In accordance with the embodiment of the present invention, the processor 610 may store log information of the digital data in the first storage unit 640 or the second storage units 642 based on the control command of the data processing application 660. Additionally, the processor 610 may control each component in the local device 600 described above, and data communication among the components.

The operating system layer of the local device 600 may include an operating system that controls each component of the local device 600. The operating system may enable applications of the local device 600 to control and use each component in the hardware layer. The operating system efficiently distributes resources of the local device 600, preparing an environment in which each application may be performed. Meanwhile, the application layer of the local device 600 may include at least one application. The application includes various types of programs so as to perform specific tasks. The application may use the resources of the hardware layer with the aid of the operating system.

In accordance with an embodiment of the present invention, the local device 600 may also include a data processing application 660. The data processing application 660 of the embodiment approaches to digital data of the external device 700 so that it performs various tasks of the digital data. Further, the data processing application 660 may generate log information of tasks of the digital data. In accordance with the embodiment of the present invention, the data processing application 660 may be included in the operating system layer or the application layer of the local device 600. That is, the data processing application 660 may be an embedded software built in the operating system layer of the local device 600, or software included in the application layer.

Next, the external device 700 may be a computing system capable of providing for the local device 600 to access to the computing system and perform analysis and process, storage management and distribution of information, as well as perform the tasks processed in conjunction with FIG. 1 FIG. 8. The external device 700 may be, e.g., a cloud system that integrates at least one or more physical servers into one virtual server and provides a computing environment using the same. The external device 700 may store digital data for computing in a DB (database) 750, and approach to necessary digital data from the DB 750.

The local device 600 is separately illustrated in a form of a block in FIG. 9 and represents the component of the device that is logically differentiated and identified. Accordingly, the component of the device may be mounted as a single chip or as multiple chips, depending on the design of the devices.

Figure 10:
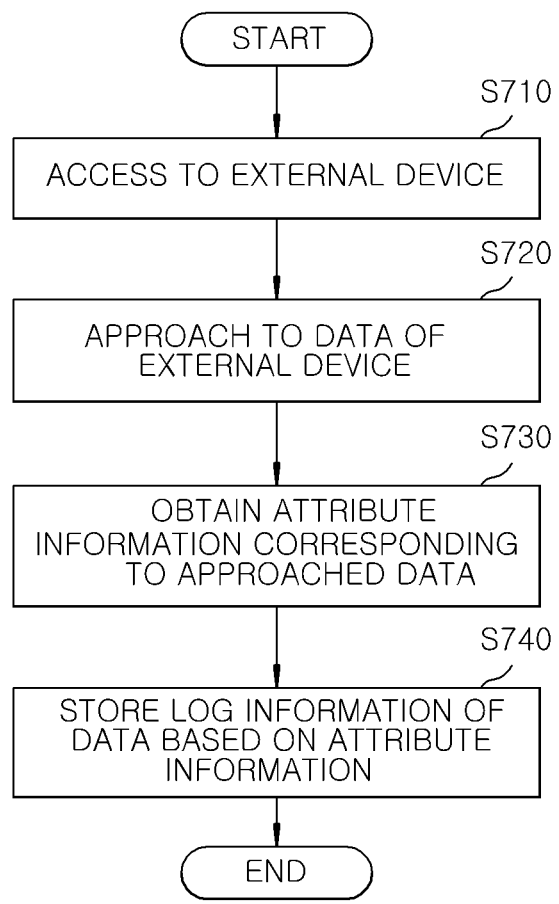
FIG. 10 is a flow diagram illustrating a method for processing data of a local device in accordance with an embodiment of the present invention.

FIG. 10 is a flow diagram illustrating a method for processing digital data of a local device in accordance with an alternative embodiment of the present invention. Hereinafter, each operation at Blocks of FIG. 10 may be performed by a local device of the embodiment. That is, the processor 610 of the local device 600 may control each operation at Blocks of FIG. 10, based on control commands of the data processing application 660 of the local device 600 illustrated in FIG. 9.

First, the local device is connected to an external device over a network (Block S710). The local device may be connected to the local device using various types of wired/wireless communication means and transmit/receive data. In this case, available wireless communication means may include a Near Field Communication NFC, a Zigbee, an infrared communication, a Bluetooth, a WiFi, a cellular network, but the embodiment is not limited thereto. Communication between the local device and the external device may be implemented using at least one of the communication means listed or the combination thereof.

Next, the local device approaches to at least digital data of the external device (Block S720). The digital data to be accessed on the external device may be determined by data processing application of the local device. That is, a user may approach to various digital data of the external device through data processing applications of the local device, and the data processing application may store the digital data or log information of the digital data in a storage unit of the local device.

Subsequently, the local device of the embodiment obtains attribute information corresponding to the digital data that is approached (Block S730). In accordance with the embodiment of the present invention, the attribute information includes a private attribute and a public attribute. In accordance with the present invention, the private attribute indicates that security of information related to the digital data needed to be maintained and the public attribute indicates that security of information related to the digital data is not needed. In accordance with an embodiment of the present invention, the attribute information may be obtained from the external device accessed by the local device. Further, in accordance with another alternative embodiment of the present invention, the attribute information may be obtained based on a user input made through the local device.

After that, the local device of the embodiment stores the log information about the digital data based on the attribute information (Block S740). In accordance with the embodiment of the present invention, the local device stores the log information in a first storage unit in the case that the attribute information is the public attribute, and in a second storage unit in the case that the attribute information is the private attribute. Further, in accordance with the embodiment of the present invention, the log information may include the digital data itself, as well as additional data generated while implementing tasks of the digital data. Accordingly, the local device of the embodiment may store the log information about the digital data having the private attribute in a volatile medium and maintain security of the log information.

Meanwhile, in accordance with another alternative embodiment of the present invention, the local device may previously assign an area on the second storage unit to store the log information of the digital data. In this case, the size of the area may be determined based on the size of the digital data having the private attribute among the digital data of the external device to which the local device has access. As such, the local device may efficiently manage the second storage unit by previously assigning an area of the second storage unit that stores the log information of the digital data of the external device.

Figures 11, 12:
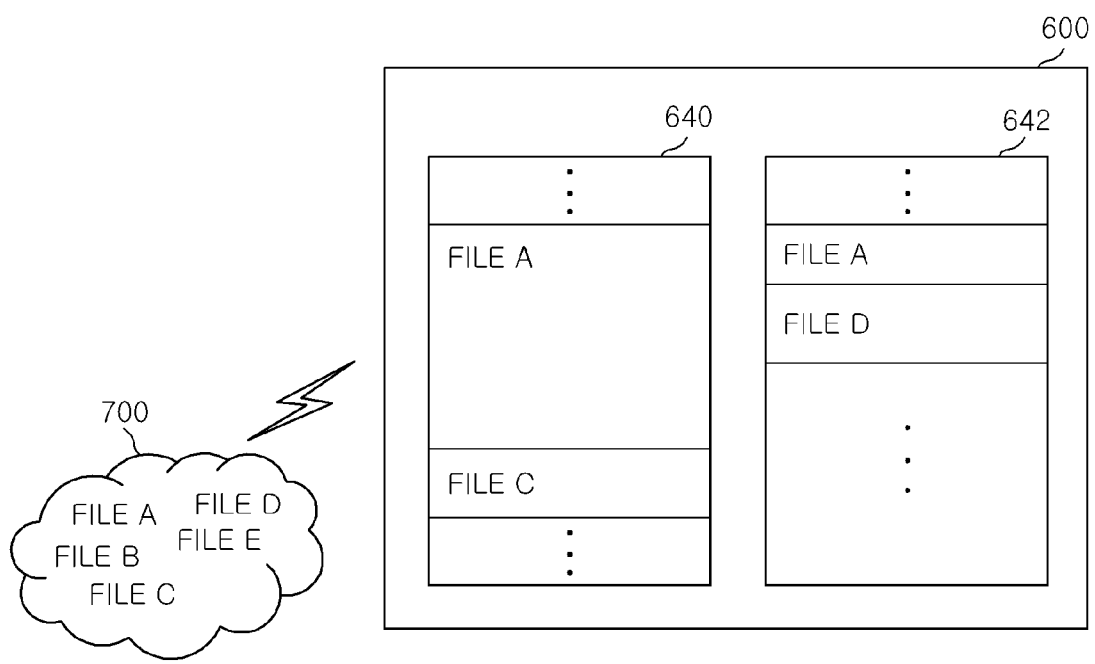
FIG. 11 illustrates digital data and attribute information of an external device in accordance with an alternative embodiment of the present invention.
FIG. 12 is a diagram illustrating the data stored in a first storage unit and a second storage unit of a local device in accordance with an alternative embodiment of the present invention.

FIG. 11 illustrates digital data and attribute information of an external device in accordance with an alternative embodiment of the present invention.

Referring to FIG. 11, digital data of the external device have attribute information corresponding to each data. In FIG. 11, attribute information of '1' indicates a private attribute, attribute information of '0' indicates a public attribute. In other words, a File A and a File D are digital data having the private attribute in accordance with the embodiment of the present invention, and File B, File C and File E are digital data having the public attribute in accordance with the embodiment of the present invention.

In accordance with the embodiment of the present invention, the attribute information about the digital data may be given in various methods. In accordance with an embodiment, attribute information about each digital data may be stored as a table or additional information on the external device. In accordance with another embodiment of the present invention, the attribute information of digital data may be set based on a user input made through the local device. For example, when a user approaches to the digital data through a data processing application of the local device, the data processing application may generate a pop-up window querying whether to perform tasks in a private mode.

When the user selects to perform tasks in the private mode, the local device may set the attribute information of the digital device in the private attribute.

When an approach to the digital file whose attribute information is the private attribute is made, the data processing application of the embodiment checks whether there is the second storage unit set in advance that stores the log information of the digital file. When the second storage unit was set in advance, the local device stores the log information of the digital file in the second storage unit. When the second storage unit is not set separately, the local device sets a specific area on a RAM as a space that stores the log information of the digital file.

FIG. 12 is a diagram illustrating the data stored in a first storage unit 640 and a second storage unit 642 of a local device 600 in accordance with an alternative embodiment of the present invention. In the embodiment of the FIG. 12, the local device 600 is approaching to a File A, File B, File C and File D among digital data (a File A to File E) of the external device 700.

As illustrated in the drawing, the local device 600 of the embodiment stores in the first storage unit 640 the log information about the data File B and File C having the public attribute of the digital data of the external device 700 to which the access has been made, and stores in the second storage unit 642 the log information about the data File A and File D having the private attribute.

In accordance with the embodiment of the present invention, there may be different cases in that the log information about the digital data having the private attribute is stored in the second storage unit 642. For example, there may be a case that a user directly stores work results of the digital data or a portion of them by commands such as 'Save/Save As'. In this case, the local device 600 permits the log information to be stored, only when a folder path intended to be stored by the user is in the second storage unit 642. In the other cases, for example, in the case that a folder path intended to be stored by a user is in the first storage unit 640, the local device 600 generates an alarm message and does not permit the log information to be stored.

Further, there is a case that data processing application 660 of the local device 600 arbitrarily stores the task results of the digital data or a portion of them, regardless of a user's intention. For example, the data processing application 660 may perform an auto save of the work contents of the digital data in a storage unit. In general, the auto-saved data are stored as a temporary file in a path assigned in advance by setting the application or operating system. In accordance with the embodiment of the present invention, the local device 600 may set the auto save folder again as a folder on the second storage unit 642 in the case that the path of the auto save folder is not in the second storage unit 642.

Meanwhile, there is a case that the process of the application or a memory area related to the process is swapped with the first storage unit 640 by the operating system of the local device 600. In this case, the local device 600 may correct memory management policies of the operating system so that digital data having the private attribute and the log information thereof are not swapped with the first storage unit 640.

The local device 600 of the embodiment may be set such that the log information about the digital data (File A, File D) with the private attribute is stored only in the second storage unit 642 or uploaded only to the external device 700. When a user ends the task of the digital data (File A, File D) without uploading the log information to the external device 700, the log information about the digital data (File A, File D) will disappear. Accordingly, when it is intended that the log information about the digital data (File A, File D) having the private attribute is stored, a user should upload the log information to the external device 700 or store it in the first storage unit 640.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for performing secure communication between a digital device and an external device, using the digital device having a radiator of a proximity sensor and a receiver of a proximity sensor, the method comprising:
   outputting a first light pattern using the radiator of the proximity sensor; and
   detecting a proximity of an object using the proximity sensor;
   when the object approaches within a predetermined distance range from the digital device, extracting key generation information based on a second light pattern received through the receiver of the proximity sensor, the second light pattern being the first light pattern reflected by the object;
   generating a security key using the key generation information;
   performing the secure communication with the external device using the generated security key;
   approaching to data stored in the external device;
   obtaining attribute information corresponding to the data, wherein the data includes first data which requires security and thereby has a private attribute as the attribute information and second data which does not require the security and thereby has a public attribute as the attribute information; and storing log information of the data based on the attribute information corresponding to the data,
   wherein said storing comprises:
   storing the log information in a first storage unit when the attribute information is the public attribute; and
   storing the log information in a second storage unit when the attribute information is the private attribute;
   wherein the extracting the key generation information comprises extracting the key generation information based on the second light pattern when the second light pattern is equal to the first light pattern.

2. The method of claim 1, further comprising stopping the output of the first light pattern when the object exists farther than the predetermined distance range from the digital device for a preset period of time.

3. The method of claim 1, further comprising detecting orientation information of the digital device,
   wherein said outputting the first light pattern comprises outputting the first light pattern when the orientation of the digital device matches a predetermined orientation.

4. The method of claim 1, wherein said performing the secure communication comprises:
   encrypting the data with the security key that is generated; and
   sending the data that is encrypted to the external device.

5. The method of claim 1, wherein said performing the secure communication comprises:
   receiving the data from the external device; and
   decrypting the data that is received with the security key.

6. The method of claim 1, wherein the second storage unit is a volatile medium.

7. The method of claim 1, wherein the first storage unit is a basic storage unit of the digital device.

8. The method of claim 1, wherein the attribute information is obtained based on a user input made through the digital device.

9. The method of claim 1, further comprising:
assigning an area of the second storage unit for storing the log information of the data,
wherein the size of the area is determined based on the a size of the data having the private attribute.

10. A digital device for performing secure communication with an external device, the digital device comprising:
a processing unit;
a proximity sensor which includes a radiator and a receiver;
a communication unit configured to transmit and receive data based on an instruction from the processing unit; and
a first storage unit and a second storage unit configured to store data based on the instruction from the processing unit,
wherein the processing unit is configured to:
allow the radiator of the proximity sensor to output a first light pattern;
detect a proximity of an object using the proximity sensor;
when the object approaches within a predetermined distance range from the digital device, extract key generation information based on a second light pattern received through the receiver of the proximity sensor, the second light pattern being the first light pattern reflected by the object;
generate a security key using the key generation information;
perform the secure communication with the external device using the generated security key;
approach to data stored in the external device;
obtain attribute information corresponding to the data that is approached,
wherein the data includes first data which requires security and thereby has a private attribute as the attribute information and second data which does not require the security and thereby has a public attribute as the attribute information;
and store log information of the data based on the attribute information corresponding to the data, wherein the log information is stored in the first storage unit when the attribute information is the public attribute and the log information is stored in the second storage unit when the attribute information is the private attribute.

11. The digital device of claim 10, wherein the second storage unit is a volatile medium.

12. The digital device of claim 10, wherein the first storage unit is a basic storage unit of the digital device.

13. The digital device of claim 10, wherein the attribute information is obtained based on a user input inputted through the digital device.

14. The digital device of claim 10, wherein the processing unit is further configured to assign an area of the second storage unit to store the log information of the data,
wherein a size of the area is determined based on a size of the data having the private attribute.

* * * * *